(12) United States Patent
Gourevitch et al.

(10) Patent No.: US 9,647,915 B2
(45) Date of Patent: *May 9, 2017

(54) DETAILED END-TO-END LATENCY TRACKING OF MESSAGES

(71) Applicant: Microsoft Technology Licensing, LLC, Redmond, WA (US)

(72) Inventors: Gregory Gourevitch, Redmond, WA (US); Todd Carlyle Luttinen, Redmond, WA (US); Wilbert De Graaf, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/865,232

(22) Filed: Sep. 25, 2015

(65) Prior Publication Data

US 2016/0014001 A1 Jan. 14, 2016

Related U.S. Application Data

(63) Continuation of application No. 12/475,391, filed on May 29, 2009, now Pat. No. 9,148,303.

(51) Int. Cl.
*G06F 15/16* (2006.01)
*H04L 12/26* (2006.01)
*H04L 12/58* (2006.01)
*H04L 29/06* (2006.01)

(52) U.S. Cl.
CPC ...... *H04L 43/0852* (2013.01); *H04L 12/5885* (2013.01); *H04L 43/067* (2013.01); *H04L 43/0858* (2013.01); *H04L 43/106* (2013.01); *H04L 51/34* (2013.01); *H04L 69/22* (2013.01)

(58) Field of Classification Search
CPC ............. H04L 43/0852; H04L 43/0858; H04L 43/106; H04L 12/5885; H04L 51/34
See application file for complete search history.

(56) References Cited

U.S. PATENT DOCUMENTS

| 6,446,028 | B1 | 9/2002 | Wang |
| 6,560,648 | B1 | 5/2003 | Dunn et al. |
| 6,717,949 | B1 * | 4/2004 | Boden ............... H04L 29/12009 370/401 |
| 6,757,543 | B2 | 6/2004 | Moran et al. |

(Continued)

OTHER PUBLICATIONS

"Final Office Action Issued in U.S. Appl. No. 12/475,391", Mailed Date: Oct. 21, 2011, 17 Pages.

(Continued)

*Primary Examiner* — Nam Tran
(74) *Attorney, Agent, or Firm* — Merchant & Gould P.C.

(57) ABSTRACT

Latency information is collected for each message as it moves through an organization. The latency information includes latency information for components processing the message. When the message is routed to the next server within the organization, the collected latency information for the server sending the message is included with the message. The collected latency information is written to a message tracking log when it either is delivered within the organization or when the message leaves the organization. The message tracking log may then be viewed such that the collected latency information may be viewed and analyzed.

20 Claims, 6 Drawing Sheets

(56) References Cited

U.S. PATENT DOCUMENTS

| | | | |
|---|---|---|---|
| 6,868,069 B2 | 3/2005 | Knobbe et al. | |
| 7,051,339 B2* | 5/2006 | Deverill | G06F 11/3419 709/202 |
| 7,127,422 B1 | 10/2006 | Bundy | |
| 7,660,321 B2 | 2/2010 | Cortes et al. | |
| 2003/0014464 A1 | 1/2003 | Deverill et al. | |
| 2003/0083847 A1 | 5/2003 | Schertz et al. | |
| 2004/0059789 A1 | 3/2004 | Shum | |
| 2004/0098478 A1* | 5/2004 | Koetke | H04L 12/5885 709/224 |
| 2006/0059238 A1 | 3/2006 | Slater et al. | |
| 2007/0113101 A1 | 5/2007 | LeVasseur et al. | |
| 2007/0217343 A1 | 9/2007 | Znamova et al. | |
| 2007/0255823 A1 | 11/2007 | Astley et al. | |
| 2009/0055491 A1 | 2/2009 | Agarwal et al. | |
| 2009/0241095 A1* | 9/2009 | Jones | G06F 11/3419 717/128 |

OTHER PUBLICATIONS

"Non Final Office Action Issued in U.S. Appl. No. 12/475,391", Mailed Date: Apr. 6, 2011, 17 Pages.

"Non Final Office Action Issued in U.S. Appl. No. 12/878,721", Mailed Date: Jan. 9, 2015, 22 Pages.

"Notice of Allowance Issued in U.S. Appl. No. 12/475,391", Mailed Date: May 20, 2015, 7 Pages.

Zimbra, "Monitoring Zimbra Servers", Retrieved from <<https://www.zimbra.com/docs/os/5.0.19/administration_guide/9_Monitoring.11.1.html>> Dec. 2008, 20 Pages.

"2009 Vision for Low-Latency Messaging", Retrieved from <<http://www.29west.com/downloads/29West-2009-latency-vision.pdf>>, 2009, 2 Pages.

"Exchange Server 2003 Monitoring Features and Tools", Retrieved from <<http://technet.microsoft.com/en-us/library/aa997513.aspx>>, May 18, 2007, 12 Pages.

"Exchange Server 2007: Process Tracking Log Tool", Retrieved from <<http://www.ditii.com/2008/02/07/exchange-server-2007-process-tracking-log-tool/>>, Feb. 7, 2008, 8 Pages.

"IBM Websphere Products Help Banks Manage Rising Market Data Volumes and Speeds", Retrieved from <<http://www.finextra.com/fullpr.asp?id=18290>>, Nov. 6, 2007, 5 Pages.

"Military Messaging (STANAG 4406)", Retrieved from <<http://www.isode.com/solutions/stanag-4406.html>>, Retrieved on Apr. 8, 2009, 13 Pages.

* cited by examiner

DETAILED END-TO-END LATENCY TRACKING OF MESSAGES

CROSS-REFERENCE TO RELATED APPLICATIONS

The present application is a continuation of and claims priority to U.S. patent application Ser. No. 12/475,391, now U.S. Pat. No. 9,148,303, filed May 29, 2009, entitled DETAILED END-TO-END LATENCY TRACKING OF MESSAGES, the disclosure of which is hereby incorporated by reference in its entirety.

BACKGROUND

Messaging systems typically include server components and client components. Many of these messaging systems keep track of how long it takes to service a message. This latency information may be used to determine a performance of the messaging system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Latency information is collected for each message as it moves through an organization. The latency information may include varying levels of detail. For example, the latency information collected for each message processed by a server may include individual time spent in various components of the server, a total time spent on the server, an estimated time spent on the server, a total aggregated time spent on previous servers, and the like. The estimated time spent on a server may be derived from the messages of legacy messaging servers that do not maintain detailed latency information for each message. When the message is routed to the next server within the organization, the collected latency information for the server sending the message is included with the message. The collected latency information is written to a message tracking log when it either is delivered within the organization or when the message leaves the organization. The message tracking log may then be accessed such that the collected latency information may be viewed and analyzed.

DETAILED DESCRIPTION

Figure 1:
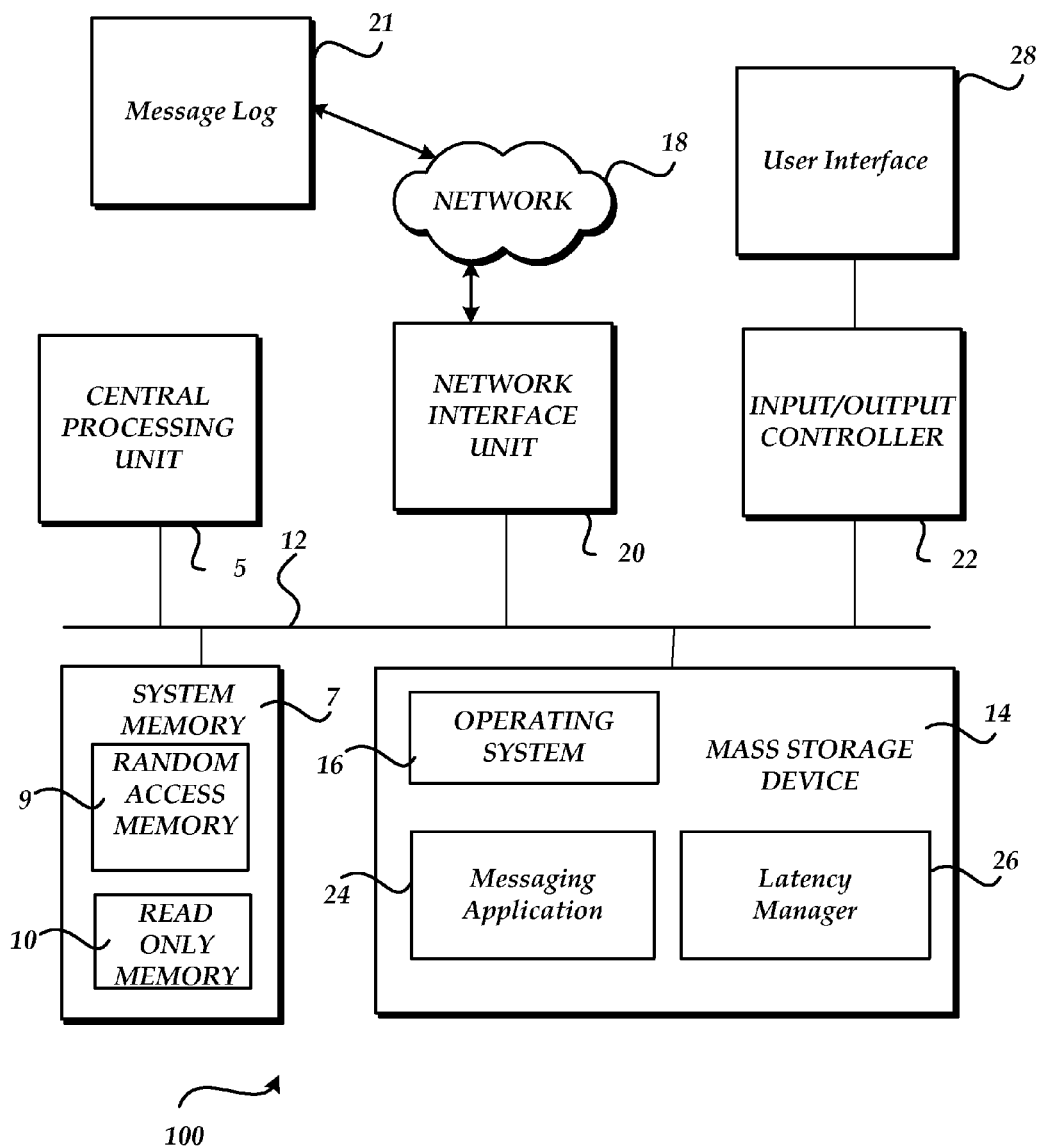
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server (e.g. a messaging server), a desktop, or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. User interface (UI) 28 is designed to provide a user with a visual way to interact with messaging application 24, as well as view latency information that is contained within message log 21. While message log 21 is illustrated externally from computer 100, the message log may also be incorporated into computer 100.

As mentioned briefly above, a number of program modules and data files may be stored in the mass storage device 14 and RAM 9 of the computer 100, including an operating system 16 suitable for controlling the operation of a networked computer, such as the WINDOWS SERVER 2008® operating system from MICROSOFT CORPORATION of Redmond, Wash. The mass storage device 14 and RAM 9 may also store one or more program modules. In particular, the mass storage device 14 and the RAM 9 may store one or more application programs. One of the application programs is a messaging application 24, such as MICROSOFT EXCHANGE SERVER 2010®.

Generally described, latency information is collected by messaging application 24 and latency manager 26 for each message as it moves through the servers of an organization. While latency manager 26 is illustrated separately from messaging application 24, latency manager 26 may be included within messaging application 24. The latency information collected may include varying levels of detail depending on the server processing the message. For example, the latency information collected for each server may include individual time spent in various components of the server 100, a total time spent on the server, a total aggregated time spent on previous servers, and the like. When the messaging application routes the message to another server within the organization, the collected latency information for the sending server is included with the message. According to one embodiment, the latency information is included within a header of the message. The collected latency information is written to a message log 21 when it either is delivered within the organization or when the message leaves the organization. The message log 21 may then be accessed by a user such that the collected latency information may be viewed and analyzed.

Figure 2:
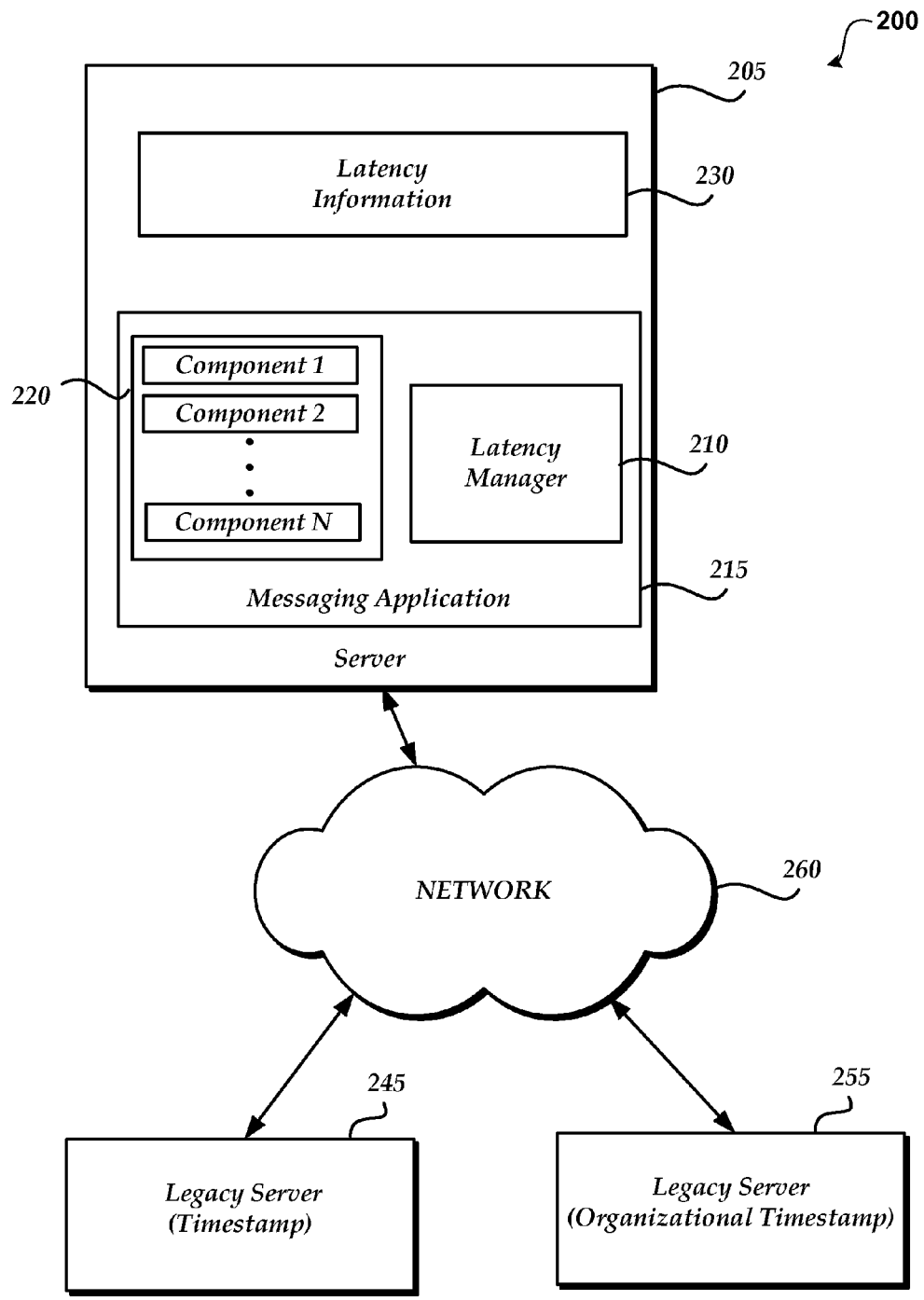
FIG. 2 illustrates a message latency tracking system.

FIG. 2 illustrates a message latency tracking system 200. As illustrated, system 200 includes server 205, legacy server 245 and legacy server 255 coupled to network 260. Server 205 comprises components 1-N (220); latency information 230, latency manager 210 and messaging application 215.

Latency may be defined as how long it takes a messaging system to service a message. Different levels of granularity may be used to define this latency, including: end-to-end latency, individual server latency, and specific component latency within a single server. For example, latency information may be collected for some or all of components 1-N (220) that are utilized in processing a message within server 205. End-to-end latency is defined as a time period between the mailbox submission (or the message entering the organizational boundary) and the mailbox delivery (or when the message leaves the organizational boundary). Individual server latency is defined as a duration of time it takes a given server to process a message.

Latency information may also be collected for legacy servers, such as legacy server 245 and legacy server 255. For example, an estimated latency time may be determined for legacy server 245 from a standard SMTP message that includes a "Received:" header that indicates when the legacy server received the message. The difference in time between when a legacy server and a time another server receives the message may be used as the estimated time for the latency information. Generally, any information within a message that may be used to calculate a time spent on a server may be used as the estimated latency time.

Different legacy servers may have different data available that may be utilized in determining latency information. For example, legacy server 255 may write the time a message is first received within an organization. Similarly, another legacy server may write the time the message leaves the organizational boundary.

Server 205 is configured to determine the latency information for some or all of the components 220 as a message is being processed. According to one embodiment, components which process messages are classified into different types of components that are each configured to perform different actions when processing a message. For example, there may be built-in components to messaging application 215, user-defined components that are incorporated into the processing of messaging application, and the like. Some of these components may be configured to operate in a serial manner in the processing of a message while other components may be configured to operate non-serially (i.e. in parallel).

As can be seen, latency information may be collected for a wide range of components 220 that interact with the message as it is being processed by server 205.

Generally, server 205 receives the message, calculates a time of involvement for each component, writes times that exceed threshold in a header of the message, and calculates and writes the overall time on server within the header. As the message goes through different components 220 of messaging server 205, the individual component latency times are calculated. According to one embodiment, any latency time that exceed a configurable threshold are recorded on the message. According to one embodiment, the latency record includes a component identifier (ID) and a time (i.e. a number of seconds the message spent there). According to one embodiment, the identifier and the time are stored as 16-bit integers resulting in a total record size of 4 bytes. The configurable threshold may be set to any value. For example, setting the threshold to zero would result in every time being entered, whereas setting the threshold to five minutes would result in much fewer entries in the header.

Each message processed within the messaging system can carry information about latencies of different granularity that it has experienced while being processed by the system. This latency information can be made available while the messages are in flight as well as logged and later used for detailed reporting and research purposes.

The latency information 230 that is collected for each server may be aggregated and stored such that an aggregated (across multiple messages) view of the latencies that messages are currently experiencing in the system may be viewed. As such, this aggregated view can show in real time a percentage of messages that experience latencies within a given range, but they do not show what specific latencies a given message has experienced. The latency that is associated with each message may also be viewed. In this way, a user may view latency information at a high level and then drill down into the latency information for a smaller group of messages and/or even a single message. The recorded data for the message(s) can be accessed and surfaced in real time via the tools of the messaging application that provide information for in-flight messages. For example, the queue viewer that is provided in MICROSOFT EXCHANGE® may be utilized. The Queue Viewer is a feature in EXCHANGE® that helps monitor an organization's messaging queues, and also the messages that are contained in those queues.

Different aggregation techniques like "global average," "sliding window average," and the like, can be used to aggregate latencies of the same component and granularity. A "percentile performance counter" may also be implemented. A percentile counter shows max latency measured for a given component for a given percent of the "fastest messages" out of all messages. For instance, a percentile counter can show that 50% of the messages completed processing in a first component in 1 sec or less, 80% completed the first component in 2 sec or less, and 99% completed the first component in 10 sec or less. Further, the sliding window concept can be used to track recent latency information and retire older data (e.g. 99% of all messages processed in the last 30 min completed the first component in less than 10 sec). According to one embodiment, the percentile performance counters are updated every time a new component latency is recorded on a message. As a result, the performance counters contain real-time information that can be immediately accessed.

Figure 3:
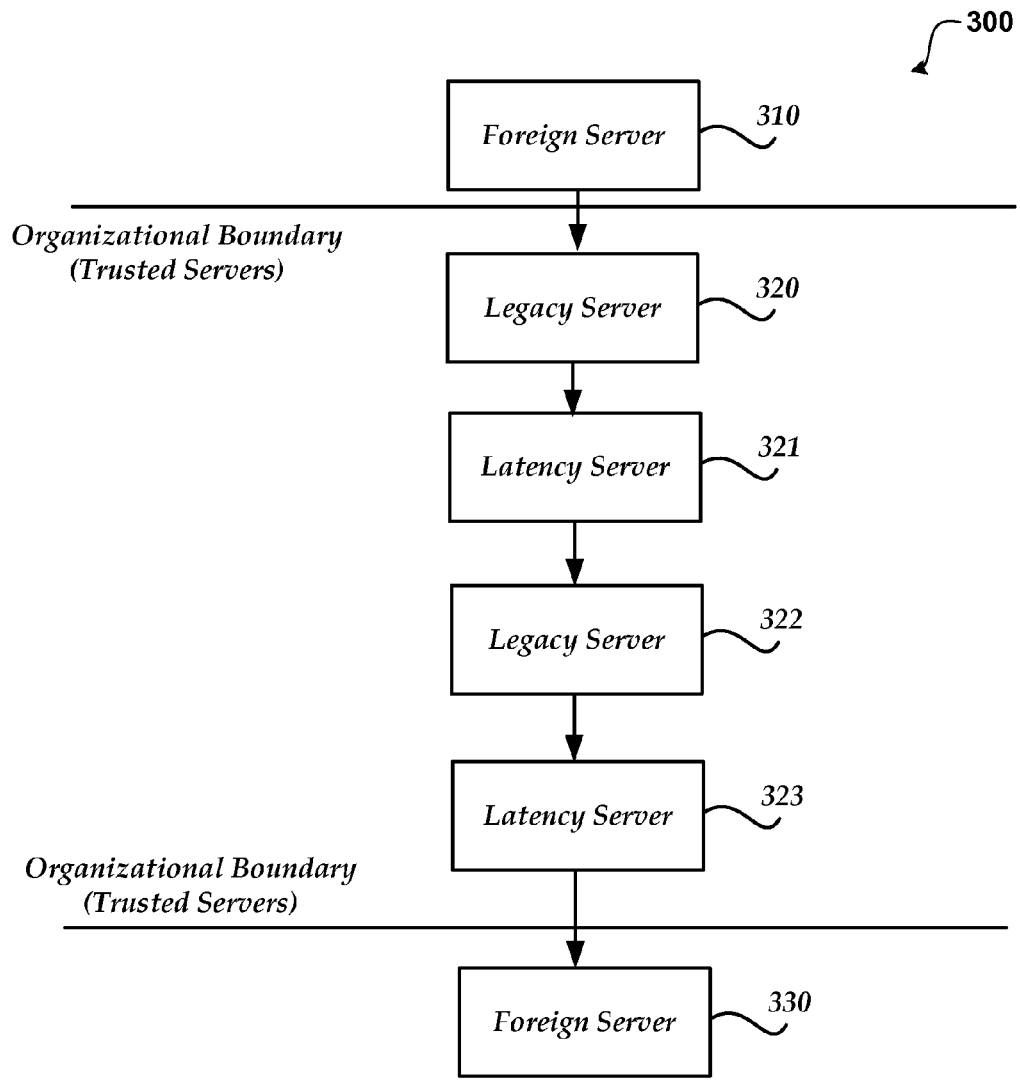
FIG. 3 illustrates latency processing that includes a mixture of legacy and latency servers.

FIG. 3 illustrates latency processing that includes a mixture of legacy and latency servers. As illustrated, FIG. 3 includes foreign servers 310 and 330 (servers outside of the organization) and trusted servers 320-323 (those servers within an organizational boundary). The trusted servers illustrated include both legacy servers and latency servers. As used herein, the term "latency server" refers to a server that is able to determine the component latencies while processing a message. The term "legacy server" refers to a server that does not determine component latencies while processing a message. The following is an exemplary message flow including legacy servers and latency servers.

Messaging systems in many organizations are highly heterogeneous with different servers using different messaging applications and different versions of a same messaging application. According to one embodiment, legacy servers are included within the latency measuring system. While legacy servers do not provide as much latency information as latency servers (i.e. they do not calculate component latencies) some latency information may be estimated from the received messages.

Referring now to FIG. 3, when a message is received from foreign server 310 at legacy server 320, legacy server marks the time it received the message. According to one embodiment, each RFC 2821/2822 "Received" headers include server fully qualified domain names (FQDNs), IP addresses and time stamps for every hop the message takes.

When the message is sent by legacy server 320 and received by latency server 321, latency server calculates an estimated time spent on legacy server 320 by accessing the time stamp in the received header added by server 320 and comparing it to the received time at latency server 321.

The first latency server within an organization boundary that receives a message performs a series of operations. According to one embodiment, this determination is made when a special header is not included within the message (e.g. a Latency header). In this example, latency server 321 is the first latency server to receive the message within the organizational boundaries. In this case, latency server 321 iterates through the "Received" headers of each message starting with the most recent one (stamped by the local server) until the header indicates that the message originated outside of the organizational boundaries. According to one embodiment, this involves examining the "From" IP address and determining when this address falls out of the range of the trusted internal IP address ranges. For each "Received:" header that originated within the organization (in this case legacy server 320), a new latency header is added with the "From" FQDN of the "Received" header and a single "Total" latency component whose value is the timestamp difference of the current and the next "Received" header. In this way, an estimated time of the total latency related to processing by legacy server 320 is included within the latency system for processing the message within the organizational boundary.

When the message is to be routed to another server within the organization then the collected latency information for the latency server placed within the latency header. According to one embodiment, the latency header contains an identifier for the server (i.e. the fully qualified domain name (FQDN), the total latency of the server (the amount of time the message spent on the server) and the detailed component latencies that exceed a predetermined threshold. According to one embodiment, after the send operation is complete for the message, the collected latency data for the local server is written to the message tracking log.

Legacy server 322 is located between a first latency server 321 and a second latency server 323. When latency server 323 receives a message from legacy server 322, latency server 323 determines that it is not the first latency server to receive a message within the organization boundary. In this case, latency server 323 iterates through the received headers until the previous latency server is reached. For each header between the latency servers, latency server 323 adds a latency header that includes the FQDN of the server and the total latency time for the server. Latency server 323 also changes the latency header for latency server 321 to indicate that latency server 321 is no longer the active latency server. Latency server 323 calculates component latencies related to its processing of the message and injects this information into the latency header.

When the message is delivered to a target mailbox or leaves the organization boundary, the information from the existing latency headers from previous hops is loaded into memory and the collected latencies for all hops within the organization including the current server (in this case Latency Server 323) are written to the message tracking log.

As a result, the message tracking log on every server includes latency information of the message for that server. The last server that processes the message has latency information of the message for all the servers the message has gone through (end-to-end) logged in the corresponding message tracking record. This model of logging different amounts of data on different hops within an organization is a balance between completeness of logged data and limiting the size of log files.

Figure 4:
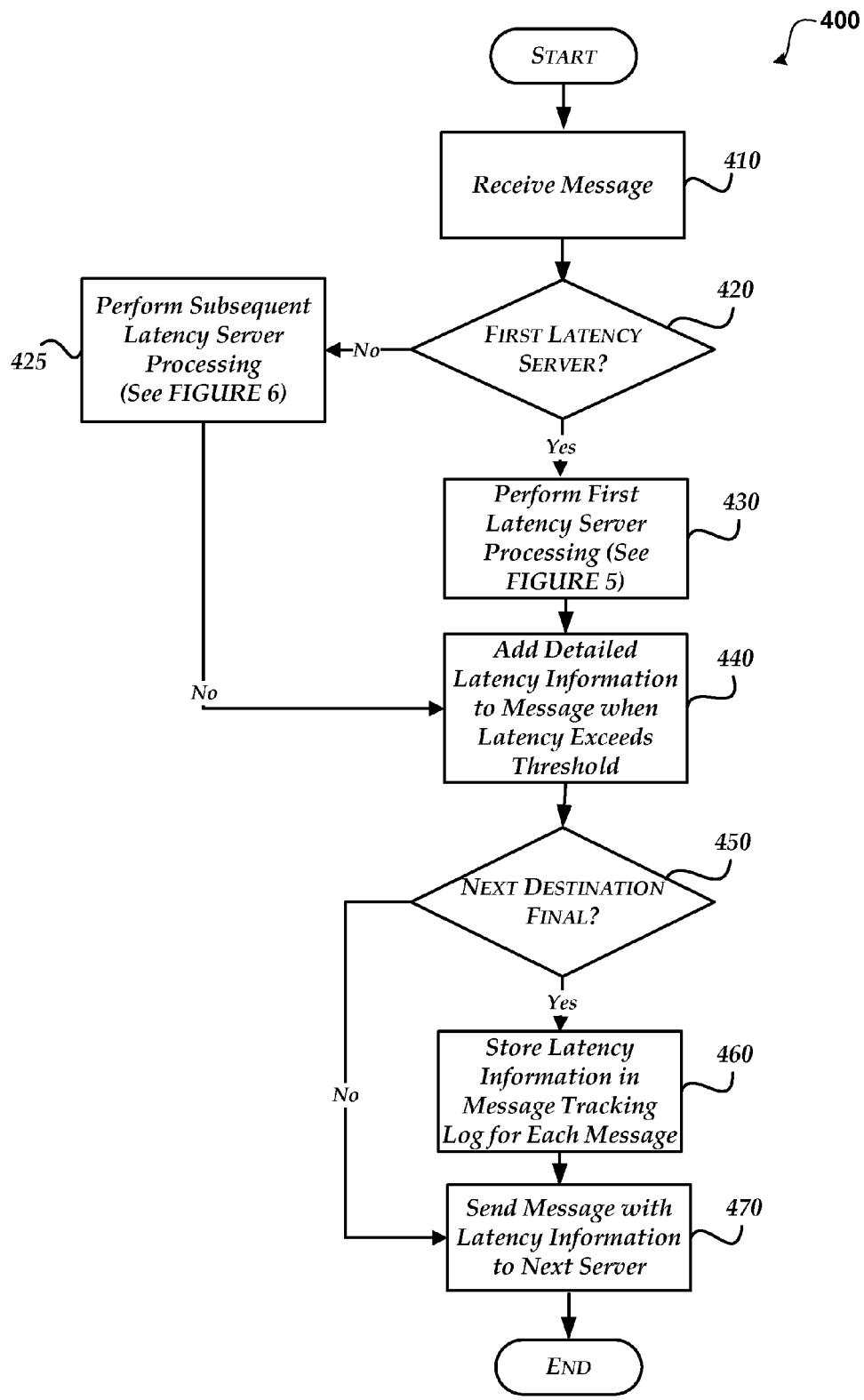
FIG. 4 shows an overview process for detailed end-to-end latency tracking of messages.
Figure 5:
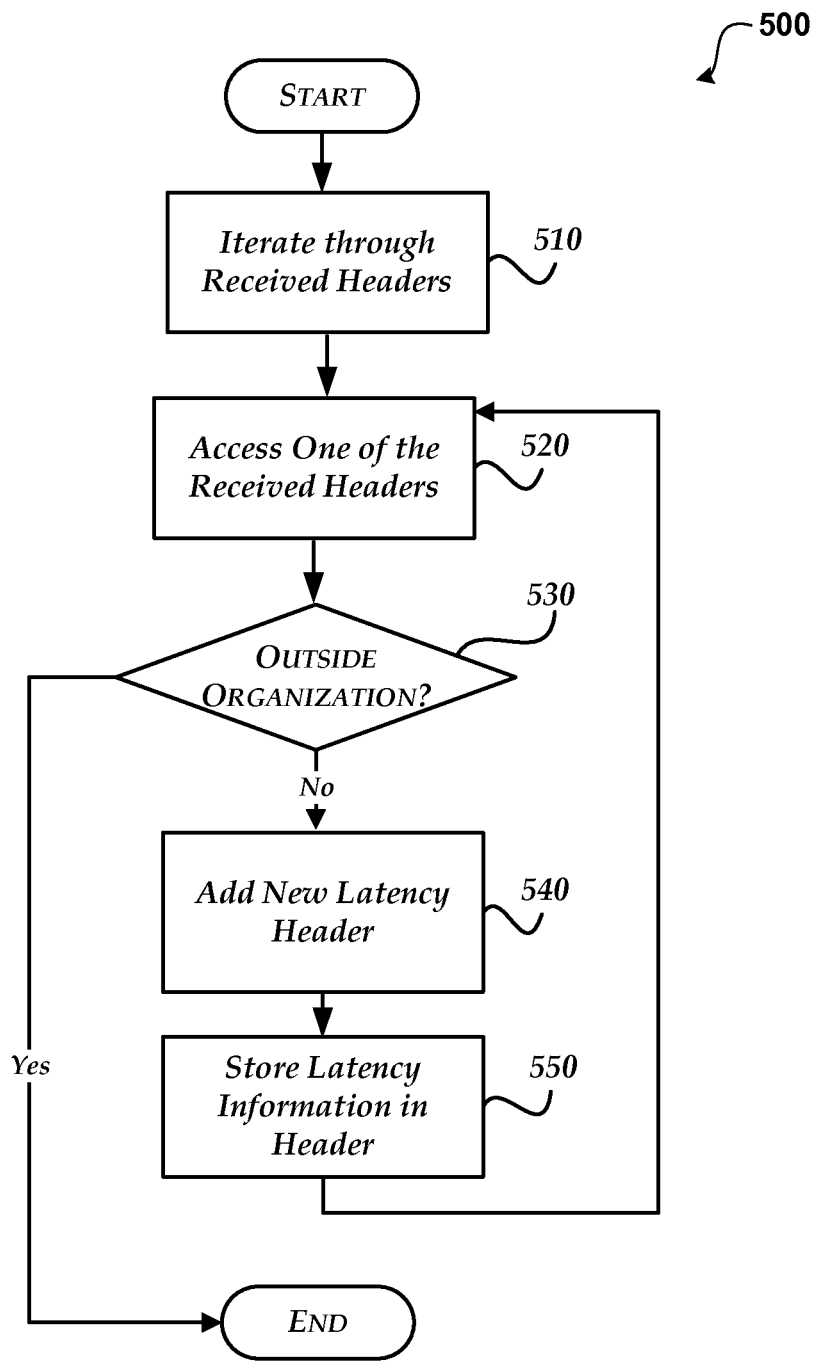
FIG. 5 illustrates a process for performing latency processing when a message is received for a first time at a latency server within an organization.
Figure 6:
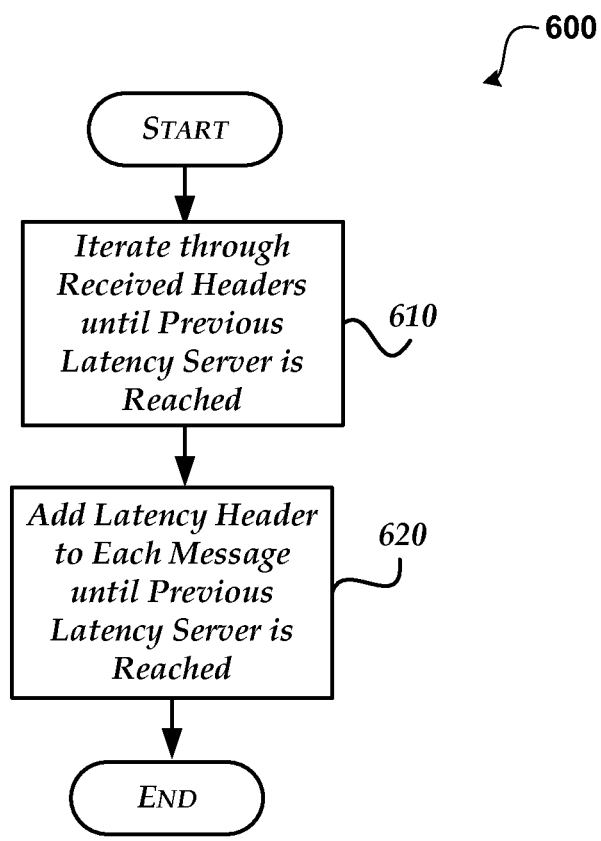
FIG. 6 illustrates a process for performing latency processing when a message is received a subsequent time at a latency server within an organization.

Referring now to FIGS. 4-6, illustrative processes for detailed end-to-end latency tracking of messages is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 shows an overview process for detailed end-to-end latency tracking of messages.

After a start operation, the process flows to operation 410, where a message is received within an organization boundary. According to one embodiment, latency tracking is not started until the message is received within the organization. Other starting points may be determined. For example, the latency tracking could start at a second server within an organization, the first latency server, and the like.

Moving to decision operation 420, a determination is made as to whether the message is received at a first latency server within the organizational boundary. As discussed above, one or more servers may be located within an organization that are positioned before a latency server that includes the ability to monitor component latencies as well as the ability to mark the headers with the detailed latency information.

When the server is not the first latency server that has received a message within the organizational boundary, the process flows to operation 425 where subsequent latency server processing is performed (See FIG. 6 and related discussion). Generally, subsequent latency server processing includes adding latency information to any legacy server's message headers that have been processed between the current latency server processing the message and the previous latency server that has processed the message. There could be zero or more legacy servers before the previous latency server.

When the server is the first latency server that has received a message within the organizational boundary, the process flows to operation 430 where first latency server processing is performed (See FIG. 5 and related discussion). Generally, first latency server processing includes adding latency information to each legacy server's message headers that have processed the message within the organizational boundary before the latency server.

The process then moves to operation 440, where detailed latency information is determined and added to the message. According to one embodiment, latency information for each component that processes the message on the server is determined. When a latency time exceeds a predetermined threshold time then that components latency information is added to the message header. One or more predetermined thresholds may be utilized. For example, a different predetermined threshold could be set for each component. Additionally, the predetermined threshold could be zero or more time units (such as microseconds, seconds, minutes, and the like).

Flowing to decision operation 450, a determination is made as to whether the next destination for the message is the final destination. According to one embodiment, the final destination is when the message is delivered or when the next hop for message is a location outside of the organizational boundary.

When the destination is final, the process moves to operation 460, where the latency information for each hop of the message is stored.

When the destination is not final, the process moves to operation 470 where the message including the latency information is sent to the next server. According to one embodiment, the latency information relating to the processing on the current server is stored within a message log.

The process then flows to an end operation and returns to processing other actions.

FIG. 5 illustrates a process 500 for performing latency processing when a message is received for a first time at a latency server within an organization.

After a start operation, the process flows to operation 510 where the latency server begins the iteration through each of the received headers.

Moving to operation 520, one of the received headers is accessed. According to one embodiment, the most recent header is accessed first.

Flowing to decision operation 530, a determination is made as to whether the header originated from outside of the organizational boundary. According to one embodiment, this decision is made by comparing the IP address within the From field of the message to a list of trusted IP addresses that represent the servers within the organizational boundary.

When the message originated from outside of the organizational boundary, the process flows to an end operation.

When the message originates from within the organizational boundary, the process flows to operation 540 where a new latency header is added to the message.

Transitioning to operation 550, the latency information for the legacy server is stored within the newly added header. According to one embodiment, the latency information includes an identifier of the server; and an estimated latency time as determined by the time stamp information.

The process then flows to an end operation and returns to processing other actions.

FIG. 6 illustrates a process 600 for performing latency processing when a message is received a subsequent time at a latency server within an organization.

After a start operation, the process flows to operation 610 where the latency server begins the iteration through each of the received headers and continues processing previous messages until the previous latency server is reached.

Flowing to operation 620, the latency header is added to each legacy server's header that is located between the current latency server and the previous latency server. When the previous latency server's header is reached, the flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of latency tracking of messages, comprising:
   receiving a message at a server within an organization;
   determining whether the server is a first latency server that has received the message within the organization;
   if the server is the first latency server, performing first latency server processing comprising iterating through received headers of the message until a previous latency server is reached;
   if the server is the first latency server, accessing one of the received headers and determining if the message originated from within the organization;
   if the message originated from within the organization, adding a latency header to the message and storing latency information for a legacy server within the added latency header; and
   if the server is not the first latency server, performing subsequent latency server processing comprising iterating through received headers of the message until the previous latency server is reached and adding a latency header to a header of a legacy server located between a current latency server and the previous latency server.

2. The method of claim 1 wherein accessing one of the headers comprises accessing a most recent header.

3. The method of claim 1 wherein the determining whether the server is a first latency server comprises comparing an IP address within the message with a list of trusted IP addresses.

4. The method of claim 1 wherein storing latency information comprises storing an estimated latency time as determined by a time stamp.

5. The method of claim 1 further comprising calculating latency information for different components on the first latency server that are involved in processing the message.

6. The method of claim 5 wherein storing latency information comprises storing latency information for each component only when the latency information exceeds a predetermined threshold.

7. The method of claim 5, wherein storing latency information comprises an identifier in the latency header for the different components that exceed the predetermined threshold.

8. The method of claim 1 wherein storing latency information comprises storing a total time of processing the message on the latency server.

9. The method of claim 1 further comprising determining whether the server that receives the message is a subsequent latency server.

10. The method of claim 9 further comprising receiving the message a subsequent time on the subsequent latency server and performing latency processing at the subsequent latency server.

11. A computer-readable storage device, not including a signal storing computer-executable instructions thereon for latency tracking of messages within an organization, comprising:
receiving a message at a server within an organization;
determining whether the server is a first latency server that has received the message within the organization;
if the server is the first latency server, performing first latency server processing comprising iterating through received headers of the message until a previous server is reached;
if the server is the first latency server, accessing one of the received headers and determining if the message originated from within the organization;
if the message originated from within the organization, adding a latency header to the message and storing latency information for a legacy server within the added latency header; and
if the server is not the first latency server, performing subsequent latency server processing comprising iterating through received headers of the message until the previous latency server is reached and adding a latency header to a header of a legacy server located between a current latency server and the previous latency server.

12. The computer-readable storage device of claim 11 wherein accessing one of the headers comprises accessing a most recent header.

13. The computer-readable storage device of claim 11 wherein the determining whether the server is a first latency server comprises comparing an IP address within the message with a list of trusted IP addresses.

14. The computer-readable storage device of claim 11 wherein storing latency information comprises storing an estimated latency time as determined by a time stamp.

15. The computer-readable storage device of claim 11 further comprising calculating latency information for different components on the first latency server that are involved in processing the message.

16. The computer-readable storage device of claim 15 wherein storing latency information comprises storing latency information for each component only when the latency information exceeds a predetermined threshold.

17. The computer-readable storage device of claim 11 wherein storing latency information comprises storing a total time of processing the message on the latency server.

18. The computer-readable storage device of claim 11 further comprising receiving the message a subsequent time on a subsequent latency server and performing latency processing at the subsequent latency server.

19. An apparatus for latency tracking of messages, comprising:
a processor an operating environment executing on the processor;
a network connection that receives a message;
a latency application that is configured to perform tasks, comprising:
receiving a message at a server within an organization;
determining whether the server is a first latency server that has received the message within the organization;
if the server is the first latency server, performing first latency server processing comprising iterating through received headers of the message;
if the server is the first latency server, accessing one of the received headers and determining if the message originated from within the organization;
if the message originated from within the organization, adding a latency header to the message and storing latency information for a legacy server within the added latency header; and
if the server is not the first latency server, performing subsequent latency server processing comprising iterating through received headers of the message until the previous latency server is reached and adding a latency header to a header of a legacy server located between a current latency server and the previous latency server.

20. The apparatus of claim 19 further comprising a subsequent latency server wherein the message is received a subsequent time on the subsequent latency server and latency processing is performed at the subsequent latency server.

* * * * *